Jan. 28, 1958 J. H. CALBECK ET AL 2,821,470
METHOD FOR OPERATING FLUIDIZATION REACTORS
Filed Sept. 29, 1953
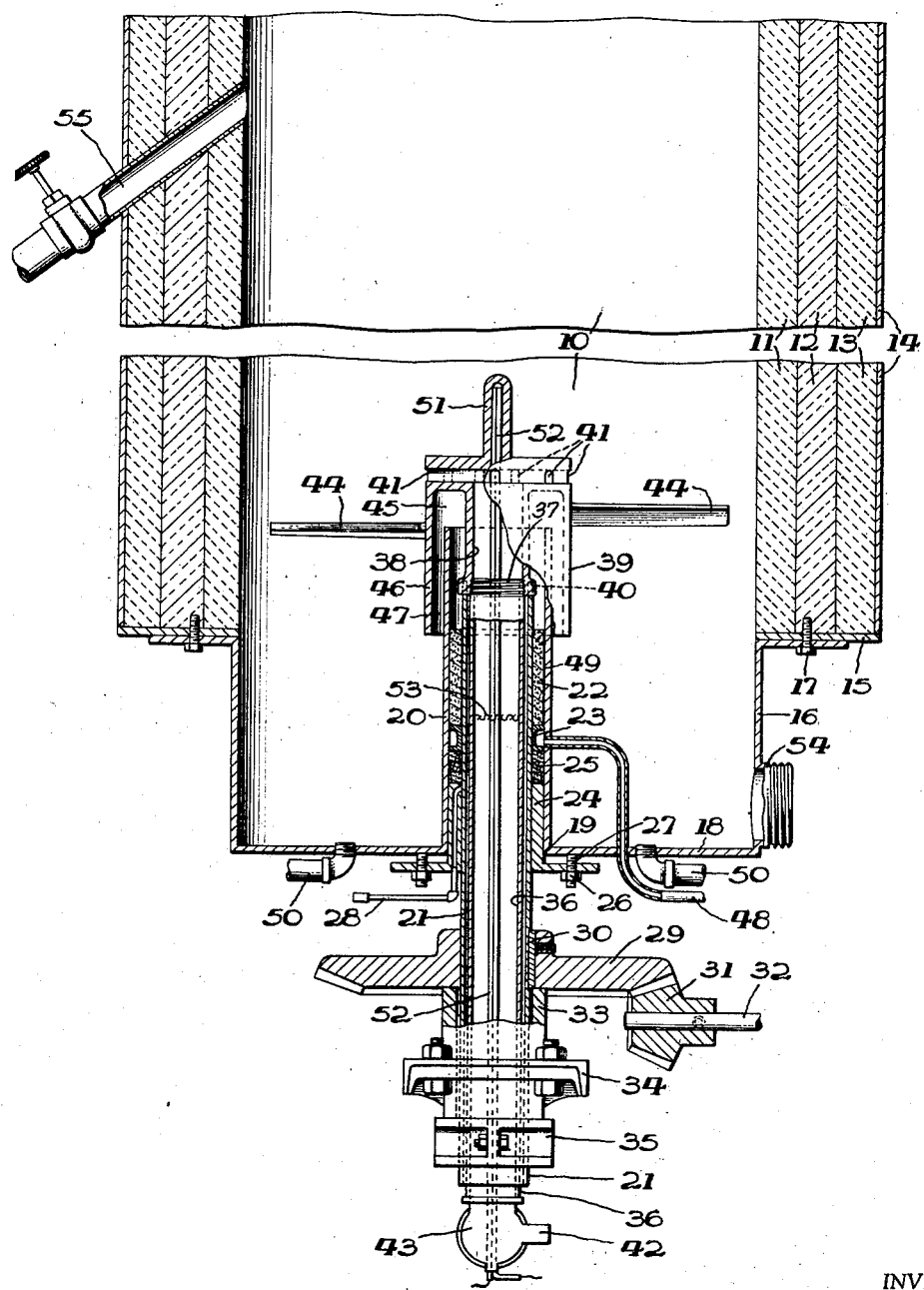
INVENTORS
John H. Calbeck
Henry B. Klimper
Richard J. Merritz
BY
Cameron, Kerkam + Sutton
ATTORNEYS

United States Patent Office 2,821,470
Patented Jan. 28, 1958

2,821,470
METHOD FOR OPERATING FLUIDIZATION REACTORS

John H. Calbeck and Henry B. Klimper, Columbus, Ohio, and Richard J. Mernitz, Washington County, Iowa, assignors to American Zinc, Lead & Smelting Company, St. Louis, Mo., a corporation of Maine Application September 29, 1953, Serial No. 382,886

3 Claims. (Cl. 75—26)

This invention relates to fluidization reactors and to methods for operating the same. More particularly this invention relates to fluidization reactors in which mechanical tuyere means are provided adjacent the bottom of the fluidization reactor to assist fluidization by mechanical agitation and to a method for operating such a fluidization reactor in which scavenging gas is introduced beneath the zone of mechanical agitation to agitate the heavier particles at the bottom of the fluidization reactor and to prevent migration of heavy vapors downwardly in the reactor.

This application is a continuation-in-part application based upon our copending application Serial No. 248,582, filed September 27, 1951, now abandoned.

Heretofore various types of fluidization reactors have been proposed in which the bottom of the fluidization chamber is usually closed by a foraminous plate through which the gases to support fluidization are introduced to the chamber. A pressure box is usually incorporated beneath the foraminous plate and the gases under pressure to support fluidization are introduced into this box.

The charge to be fluidized is prepared by grinding and screening or like methods to obtain a particle size distribution favorable to fluidization. In some types of fluidization reactions, however, particularly metallurgical operations such as the roasting of ores and the reduction of oxidized materials, the particles undergo extreme changes in size and shape including growth of particles and agglomeration of small particles into larger aggregates. These adverse effects are often aggravated by a build-up of fusible impurities in the charge. Classification of the particles in fluidized condition then takes place in the fluidization chamber and the larger and heavier particles migrate downwardly. Any vapors heavier than the gases supporting fluidization also migrate downwardly into relatively cool regions where they may condense on the apparatus, or on the heavy particles causing further agglomeration thereof. The result is that the openings in the usual foraminous plate soon become plugged and fluidization ceases until the apparatus is cleaned. If instead of using a foraminous plate, tuyeres are located in the sides of the fluidization reactor above its bottom, the heavier particles settle beneath the tuyeres and quickly sinter together before they can be drawn off, soon building up to the point where fluidization is terminated.

In cases where hydrocarbon gases are employed not only to maintain fluidization but also to provide heat by burning in surface contact with the fluidized particles and where appropriate, to provide a reducing medium for metallic particles in fluidized condition, the danger of flash back into the pressure box beneath the foraminous plate and of consequent risk of explosion is always present, but is aggravated as the gas discharge openings become plugged.

Further, with known fluidization reactors the degree of fluidization of the heavier particles migrating beneath the zone of complete fluidization is not sufficient to enable these particles to be withdrawn from the fluidization reactor without mechanical assistance.

It is accordingly an object of the present invention to provide such a fluidization reactor which will overcome the disadvantages inherent in the use of a foraminous plate; which will prevent clogging of the heavier particles at the bottom of the fluidization reactor; and which will prevent the migration of heavy vapors downwardly in the fluidization reactor.

Another object is to provide a novel fluidization reactor incorporating a mechanical tuyere in which the heavier particles below the tuyere ports are mechanically agitated by the rotation of the tuyere and are further agitated by scavenging gas introduced beneath the zone of mechanical agitation through the mechanical tuyere structure.

Another object is to provide such a fluidization reactor which, in place of the usual foraminous plate, has relatively few tuyere ports through which the gases supporting fluidization are emitted at relatively high velocities.

Further objects are to provide such a fluidization reactor and mechanical tuyere in which the dangers of explosion are eliminated and in which the mechanical tuyere can be easily removed for replacement or repair.

A still further object is to provide such a novel fluidization reactor and mechanical tuyere in which the gases supporting fluidization can be introduced at higher velocities than have heretofore been possible and in which the particle size of the material to be fluidized can be greater than has heretofore been practical.

Other and further objects of the present invention will appear from the following description.

The invention is applicable to various types of fluidization reactions including both endothermic and exothermic reactions, and also to reactions where the particle size of the fluidized solids remain constant as well as to those in which the particle size changes as mentioned above. Further it can be utilized to advantage in connection with reactions in which the reaction heat is supplied externally, or internally by the incorporation of solid fuel with the charge or by the combustion of hydrocarbon gases in contact with the charge. Its maximum benefits are realized and hence it can best be described with reference to processes in which hydrocarbon gases are burned in contact with the charge to produce fluidization and to supply the heat necessary for an endothermic reaction where the particle size of the fluidized particles changes during the reaction. An example of such a process is found in the reduction of oxidized zinciferous materials, as described and claimed in the copending application of John H. Calbeck entitled "Process of Manufacturing Pigment Zinc Oxide," Serial No. 244,951 filed September 4, 1951, now Patent No. 2,747,966. The process of this copending application is referred to hereinafter in describing the present invention, but it is to be expressly understood that the invention is so described by way of illustration only and that reference should be had to the appended claims for a definition of its limits.

The accompanying drawing shows a portion of a fluidization reactor embodying the invention and suitable for practicing the process of said copending application.

Referring now to the drawing, 10 is any suitable fluidization chamber preferably arranged vertically and surrounded by any suitable refractory wall 11 protected by insulating layers 12 and 13, the entire wall assembly being enclosed in a suitable metallic casing 14, 15. A cup shaped member 16 is suitably secured to the casing wall 15 as by bolts 17 and closes bottom of reaction chamber 10. The bottom 18 of member 16 is centrally apertured at 19 and is provided with a hollow cylindrical upstanding extension 20. A hollow tubular drive shaft 21 is mounted for rotation within extension 20 and is suitably spaced therefrom by bearing 22 and spacer 23. A suitable gland 24 and packing 25 is provided to prevent any pressure losses between shaft 21 and extension 20. The pressure exerted by gland 24 on packing 25 is regulated by nuts 26 mounted on threaded studs 27 in known manner. Lubrication for the bearing surfaces of shaft 21 and gland 24 is provided through pipe 28.

Tubular drive shaft 21 is rotated by crown gear 29 which is suitable connected thereto as by key 30. Crown gear 29 is driven by gear 31 which in turn is rotated by any suitable means through shaft 32. A suitable bearing 33 is supported by a bracket 34, and shaft 21 is mounted for rotation within bearing 33 with gear 29 bearing upon the upper end thereof. A collar 35 may be employed to unite the elements of bearing 33.

A second hollow tubular shaft 36 is mounted within shaft 21 and is provided at its upper end with suitable external threads 37 engaging the internally threaded lower end of chamber 38 of tuyere head 39. The upper end of drive shaft 21 is provided with lugs or teeth 40 engaging corresponding notches formed in the outer periphery of the lower end of chamber 38 so that the shafts 21 and 36 and the tuyere head 39 rotate together, but the driving connection can be disengaged easily for removal of the tuyere head as described hereinafter.

Internal chamber 38 of tuyere head 39 opens into a suitable number of tuyere ports 41. Tuyere ports 41 are relatively few in number and of relatively large diameter as compared with the openings in the usual foraminous plate. For example, eight such ports one half inch in diameter have been used with good results in a reaction chamber 10 of twenty-two inch diameter. Hydrocarbon gas mixtures supporting fluidization in chamber 10 and providing combustible and reducing gaseous agents are introduced through pipe 42 into flexible connection 43 and pass through tube 36 to chamber 38 and outwardly through the tuyere ports 41.

Tuyere head 39 is provided beneath ports 41 with suitable paddles 44 that are preferably pitched appropriately to cause agitation in an upward direction of the fluidized particles when tuyere head 39 is rotated. Tuyere head 39 is provided with a chamber 45 having downwardly depending skirts 46 which extend parallel to and are spaced from extension 20 to provide an annular passage 47. Scavenging gas is supplied under pressure through pipe 48 which opens into the space beneath bearing 22 and adjacent spacer 23. This scavenging gas passes upwardly around bearing 22, which is perforated or longitudinally grooved as at 49 for better gas circulation, enters chamber 45 and passes downwardly through passage 47 and out into chamber 10. Additional scavenging gas may be admitted to chamber 10, when required, through pipes 50.

Tuyere head 39 may be provided with a hollow upstanding extension 51 in which a suitable pyrometer rod 52 is mounted. Pyrometer rod 52 is utilized, in known manner, for determining temperatures adjacent the tuyere ports 41.

Any suitable flame trap of metallic gauze or the like may be mounted within tube 36 as at 53 to prevent flash back and explosion should there be a failure of pressure of the hydrocarbon gases at ports 41.

A suitable aperture 54 may be provided in member 16 for use in withdrawing the heavier particles of partially fluidized solids which collect beneath tuyere head 39 and another aperture 55 is provided to take off reactor overflow.

In using the fluidization reactor and mechanical tuyere described above for the production of pigment zinc oxide as disclosed in the aforesaid copending application, the reaction chamber 10 is filled up to the level of paddles 44 with a cold charge of comminuted zinc calcines of appropriate particle size no coarser than 10 mesh and 70% coarser than 325 mesh. The empty reaction chamber 10 above the tuyere ports 41 is then brought to a temperature of approximately 1000° C. by the combustion of suitable hydrocarbon gas and air mixtures admitted to tuyere ports 41 through pipe 42 and ignited at tuyere ports 41. Simultaneously a suitable quantity of scavenging gas, which may be approximately 1/10 to 1/4 the volume of the mixed gases admitted at pipe 42, is passed through pipe 48 and pipes 50 and into the reaction chamber through passage 47.

When the temperature adjacent extension 51 approaches 1000° C., tuyere head 39 is rotated at about 2 R. P. M. and the desired quantity of pre-heated comminuted zinciferous material of appropriate particle size is continuously fed into chamber 10 from above. Fluidization is immediately established above the tuyere ports 41 and partially around the blades 44. Fluidized zinciferous material of depleted zinc content may be withdrawn from the reactor through the reactor overflow 55 which establishes the operating level in the reactor. The rising column of scavenging gas from passage 47 must be in sufficient volume and at sufficient velocity to keep the charge beneath paddles 44 open and prevent downward migration of heavy metallic vapors, being supplemented if necessary by additional scavenging gas introduced through pipes 50. By preventing downward migration of heavy gases or vapors into the bottom space below the blades 44, moreover, the scavenging gas from passage 47 and from pipes 50 prevents condensation of such vapors in the cooler zone at the bottom of the reactor, with consequent cementing of the particles together, as well as objectionable accretions on the apparatus of condensed material such as the "rock oxide" often deposited by zinc vapors. The material in the bottom space is thus maintained in open and agitated condition and remains sufficiently fluid that it can be withdrawn at any time through the port 54, either continuously or periodically as may be desired.

It is apparent that the zone of highest temperatures within fluidization chamber 10 is above tuyere ports 41 so that the rotating tuyere and its blades 44 are not subject to extremes of temperature. In addition, the scavenging gas introduced through pipe 48 may cool these parts if not pre-heated before admission. However, after relatively extended periods of service tuyere head 39 may become unserviceable. It is then a relatively easy matter to remove the rotating tuyere for repair or replacement. Under these circumstances fluidization reaction chamber 10 is emptied, flexible connection 43 is uncoupled, and tuyere 39 and tubular member 36 are removed upwardly through chamber 10, the lugs 40 permitting separation of these parts from the drive shaft 21.

In any fluidized solids system the quality of fluidization varies with the depth of the vessel, and this variation is especially noticeable when the heat is provided by internal combustion such as described above. Not only is the velocity of the fluidizing gases much lower at the bottom of the vessel, because as combustion progresses the temperature also increases, but actually below the tuyeres there is normally no agitation and at the same time a build-up of non-fluidizable large particles occurs. The invention provides ample mechanical agitation in this zone where the gas velocity is low, resulting in a less marked line of demarcation between the dormant and the fluidized zones in the reaction chamber. The rising column of scavenging gas introduced at the lowest point in the chamber considerably below the tuyere level, together with the mechanical agitation, maintains a uniform gradient of agitation in the reaction vessel from the bottom up to the point of good fluidization. Material drawn off at a point below the tuyere level will run out like water and no poking or raking is necessary. The accumulation of larger particles in the bottom of the reactor is thus not objectionable, and is actually an advantage because the larger particles break up the streams of gases issuing from the tuyere ports, resulting in more even distribution of gas in the bottom of the reactor and minimizing "slugging."

The mechanical agitation described above is especially useful in starting up a reactor or for restoring a reactor to normal operation if for any reason the quality of fluidization becomes poor and a shutdown is threatened. Furthermore, this mechanical agitation makes possible a high quality of fluidization by the use of a small number of ports or tuyeres of large diameter instead of the usual perforated plate with a large number of smaller ports or holes.

In many fluidization processes combustible or explosive mixtures of gases are added to the reactor both as a fluidization medium and as a reagent or reacting gas, and the accumulation of such gas in volume under a perforated plate creates an explosion hazard. The present invention utilizes a small number of high velocity ports or jets, minimizing the danger of backfire and explosion, while at the same time it provides the high quality of fluidization normally obtained with a perforated plate.

It should be noted that ample air for both combustion and reaction can be introduced as scavenging gas, the tuyere ports being used only for the hydrocarbon or fuel gases. Such an arrangement may be advisable if a mixture so lean as to cause "flash back" at the tuyeres is being used, in which event a richer gas mixture may be used in the tuyeres and the additional air supplied as scavenging gas. The reverse may also be practiced, the hydrocarbon gas being admitted as scavenging gas and only air or oxygen being admitted at the tuyere ports in which case the ratio of hydrocarbon gas to air would approximate 1/7. This may be desirable when commercial oxygen is to be used for all or part of the combustion because oxygen-fuel gas mixtures are hazardous to convey in pipes leading to furnaces.

A neutral gas such as nitrogen can be used as the scavenging gas but in view of the additional expense so involved we prefer to use the same gas used for heating and reducing purposes such as natural gas in which case the volume of scavenging gas will approximate ¼ the total of combustible gas required.

The use of high velocity jets together with mechanical agitation also permits the use of coarser material in the charge, which is another advantage of the invention. For example, in a typical fluidization reactor using a perforated plate, it is usually necessary for 90% of the feed to pass 60 mesh and for not less than 50% to pass 300 mesh. When the present invention is employed, however, good results are obtained with a charge 90% of which passes 10 mesh and 50% of which passes 60 mesh.

As noted above the charge and feed of comminuted zinciferous material in and to the reactor 10 should have approximate particle size no coarser than 10 mesh and 70% coarser than 325 mesh. A typical screen analysis of this feed is as follows:

| Mesh Size | Mascot Calcine, percent | Mascot Sinter, percent |
|---|---|---|
| Thru 10 on 20 | 1.23 | 55.0 |
| 20 on 35 | 7.40 | 31.40 |
| 35 on 65 | 10.80 | 7.64 |
| 65 on 80 | 3.65 | .45 |
| 80 on 100 | 9.15 | 1.55 |
| 100 on 150 | 8.60 | 1.08 |
| 150 on 200 | 8.55 | .80 |
| 200 on 325 | 7.40 | .72 |

After removal of a portion of the metallic zinc from the fluidized bed as zinc vapor analysis of reactor overflow from outlet 55 shows typical particle size for four representative runs as follows:

| Mesh Size | #1 | #2 | #3 | #4 |
|---|---|---|---|---|
| On 10 | | | 1.3 | 2.7 |
| Thru 10 on 20 | 6.00 | 12.25 | 21.95 | 9.2 |
| 20 on 35 | 38.20 | 61.45 | 63.9 | 61.85 |
| 35 on 65 | 37.90 | 22.60 | 10.87 | 22.6 |
| Thru 65 on 80 | 4.50 | 1.15 | .4 | 1.6 |
| 80 on 100 | 8.80 | 1.65 | .7 | 1.3 |
| 100 on 150 | 3.15 | .25 | .2 | .4 |
| 150 on 200 | .70 | .12 | .1 | .15 |
| 200 on 325 | .25 | .10 | .05 | .05 |
| 325 | .50 | .10 | .0 | .0 |

As emphasized above the scavenging gas admitted beneath the agitator blades 44 performs the critical functions of preventing the migration downward of metallic vapors and additionally agitates the heavy particles at the bottom of the reactor. It has been indicated that the volume of this scavenging gas may vary from $\frac{1}{10}$ to $\frac{1}{4}$ of the volume of the gas admitted at pipe 42 and through the tuyere ports 41. The volumes and velocities of the gases in three representative runs are as follows:

*Volumes of gases in C. F. M. at 40° C. and 760 mm.*

| Runs | Total above Tuyeres | Scavenging below Tuyeres | Percent Scavenging Gas |
|---|---|---|---|
| M-14 | 227 | 49 | 21.6 |
| M-15 | 197 | 32 | 16.2 |
| M-16 | 204 | 25 | 12.2 |

*Vertical velocities [1] in feet per second at 1100° C. and 760 mm.*

| Runs | Total above Tuyeres | Scavenging below Tuyeres |
|---|---|---|
| M-14 | 2.76 | 0.598 |
| M-15 | 2.40 | 0.390 |
| M-16 | 2.46 | 0.305 |

[1] Calculated on the basis of an empty reactor having a horizontal cross section of six square feet.

It should now be apparent to those skilled in the art that the present invention provides a novel fluidization reactor and mechanical tuyere incorporating the use of mechanical agitation and scavenging or bottom air which in every way satisfies the several objectives discussed above.

Changes in or modifications of the described illustrative embodiment of the present invention may now be suggested to those skilled in the art without departing from the present inventive concept. Also it will be understood that in some cases, especially where there are no heavy metallic vapors, the use of bottom air such as that introduced through pipes 48 and 50 may not be necessary, the mechanical agitation alone being sufficient to maintain the material below the tuyere ports in a sufficiently fluid condition for it to be drawn off through the outlet 54 whenever necessary. Reference should therefore be had to the appended claims to determine the scope of this invention.

What is claimed is:

1. A method for conducting a fluidization essentially chemical reduction reaction wherein a zinciferous material is reduced and vapors rich in metallic zinc are produced by blowing a plurality of streams of gas into a mass of finely divided zinciferous materials no coarser than 10 mesh and 70% coarser than 325 mesh to maintain said solids in completely fluidized condition from the point of admission of the gas and by mechanically agitating said solids in the lower part of the fluidization zone adjacent the points of entry of said streams whereby distribution of said fluidizing gas is uneven, the step of maintaining said solids in a partially fluidized non-reacting, non-heating zone beneath the point of admission of the fluidizing gas by admitting non-combustible scavenging gas beneath the points of entry of said streams of gas with volumes ranging from one tenth to one quarter of the volumes of said streams of gas whereby downward migration of metallic vapors beneath the streams of gas is prevented and additional agitation of said solids in the partially fluidized zone is provided without heating and chemical reaction in said partially fluidized zone.

2. A method for conducting a fluidization essentially chemical reduction reaction wherein a zinciferous material is reduced and vapors rich in metallic zinc are produced by maintaining finely divided zinciferous material of particle size no coarser than 10 mesh and 70% coarser than 325 mesh in a state of fluidization in a reaction zone by admitting fluidizing gas into said zone at a point above its bottom at velocities of from 2 to 3 feet per second at 1100° C. and 760 mm. pressure, the step of maintaining said material in a partially fluidized non-reacting, non-heating zone beneath the point of admission of the fluidizing gas by admitting non-combustible scavenging gas to said partially fluidized zone beneath the level of admission of said fluidizing gas at velocities of from 0.3 to 0.6 foot per second at 1100° C. and 760 mm. pressure and in volumes of from one tenth to one quarter the volume of said fluidizing gas to maintain said non-heating, non-reacting zone of partial fluidization between the levels of admission of said gases.

3. A method for conducting a fluidization essentially chemical reduction reaction wherein a zinciferous material is reduced and vapors rich in metallic zinc are produced by admitting fluidizing gases to finely divided zinciferous materials comminuted to no coarser than 10 mesh and 70% coarser than 325 mesh to fluidize said solids and mechanically agitating the solids beneath the zone of admission of said gases, the steps of admitting non-combustible scavenging gas to the solids beneath the zone of mechanical agitation, said scavenging gas being admitted at vertical velocities ranging from 0.3 to 0.6 foot per second at 1100° C. and at 760 mm. pressure and in volumes ranging from one tenth to one quarter the volumes of said fluidizing gases, and of controlling the mechanical agitation and the admission of said scavenging gas to maintain partial fluidization of the solids in a non-reacting, non-heating zone beneath the zone of admission of said fluidizing gas.

References Cited in the file of this patent
UNITED STATES PATENTS

| | | |
|---|---|---|
| 2,070,235 | Mullen | Feb. 9, 1937 |
| 2,404,944 | Brassert | July 30, 1946 |
| 2,747,966 | Calbeck | May 29, 1956 |